US008384500B2

(12) United States Patent
Rofougaran et al.

(10) Patent No.: US 8,384,500 B2
(45) Date of Patent: *Feb. 26, 2013

(54) METHOD AND SYSTEM FOR MEMS SWITCHES FABRICATED IN AN INTEGRATED CIRCUIT PACKAGE

(75) Inventors: Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 1444 days.

This patent is subject to a terminal disclaimer.

(21) Appl. No.: 11/956,106

(22) Filed: Dec. 13, 2007

(65) Prior Publication Data

US 2012/0313723 A1    Dec. 13, 2012

(51) Int. Cl.
    *H01P 1/10*    (2006.01)
(52) U.S. Cl. .......................... 333/262; 333/105
(58) Field of Classification Search ............ 333/101, 333/103, 104, 105, 262; 200/181; 335/78
    See application file for complete search history.

(56) References Cited

U.S. PATENT DOCUMENTS

| | | | |
|---|---|---|---|
| 5,914,873 A | 6/1999 | Blish, II | |
| 6,570,442 B2 | 5/2003 | Nakai et al. | |
| 6,590,468 B2 | 7/2003 | du Toit et al. | |
| 6,848,178 B2 | 2/2005 | Kondo et al. | |
| 6,940,365 B2 * | 9/2005 | Kamata et al. | 333/175 |
| 7,045,440 B2 * | 5/2006 | Huff et al. | 438/456 |
| 7,071,431 B2 * | 7/2006 | Ruan et al. | 200/181 |
| 7,138,884 B2 | 11/2006 | Cheung et al. | |
| 7,183,633 B2 | 2/2007 | Daneman et al. | |
| 7,336,232 B1 | 2/2008 | Lee et al. | |
| 7,348,842 B2 | 3/2008 | Ichitsubo et al. | |
| 7,372,349 B2 * | 5/2008 | Wheeler et al. | 335/78 |
| 7,385,286 B2 | 6/2008 | Iwaki et al. | |
| 7,515,879 B2 | 4/2009 | Okabe et al. | |
| 7,518,248 B2 | 4/2009 | Li et al. | |
| 2003/0001251 A1 | 1/2003 | Cheever et al. | |

(Continued)

FOREIGN PATENT DOCUMENTS

CN    1536687    10/2004
EP    1 580 841    9/2005

(Continued)

OTHER PUBLICATIONS

Elliott Brown, "RF MEMS Switches for Reconfigurable Integrated Circuits", Nov. 1998, vol. 46, No. 11, pp. 1868-1880.

*Primary Examiner* — Dean O Takaoka
(74) *Attorney, Agent, or Firm* — Farjami & Farjami LLP (57) ABSTRACT

Methods and systems for MEMS switches fabricated in an integrated circuit package are disclosed and may include controlling switching of RF components, and signals handled by the RF components, within an integrated circuit. One or more MEMS switch arrays embedded within a multi-layer package bonded to the integrated circuit may be utilized for the switching and signal control. The RF components and one or more MEMS switch arrays may be integrated in the multi-layer package. The RF components may be electrically coupled to the integrated circuit via the one or more MEMS switch arrays. The MEMS switch arrays may be electrostatically or magnetically activated. The RF components may be coupled to one or more capacitor arrays in the integrated circuit. The RF components may include transformers, inductors, transmission lines, microstrip and/or coplanar waveguide filters and/or surface mount devices. The integrated circuit may be coupled to the multiple-layer package utilizing a flip-chip bonding technique.

22 Claims, 6 Drawing Sheets

U.S. PATENT DOCUMENTS

| | | |
|---|---|---|
| 2004/0016995 A1 | 1/2004 | Kuo et al. |
| 2004/0222506 A1 | 11/2004 | Wei et al. |
| 2004/0264152 A1 | 12/2004 | Heck |
| 2005/0023656 A1 | 2/2005 | Leedy |
| 2005/0104694 A1 | 5/2005 | Cho |
| 2005/0161753 A1 | 7/2005 | Huff et al. |
| 2005/0212642 A1 | 9/2005 | Pleskach et al. |
| 2005/0285697 A1 | 12/2005 | Chou |
| 2006/0152911 A1 | 7/2006 | Humbert et al. |
| 2007/0062027 A1 | 3/2007 | Ripamonti et al. |
| 2007/0207761 A1 | 9/2007 | LaBerge |
| 2009/0127674 A1 | 5/2009 | Suzuki |

FOREIGN PATENT DOCUMENTS

| | | |
|---|---|---|
| KR | 20070027754 | 3/2007 |
| KR | 20070097963 | 10/2007 |
| KR | 20070108858 | 11/2007 |
| TW | I236763 | 7/2005 |
| TW | 200737592 | 10/2007 |
| WO | WO 02/096166 | 11/2002 |

\* cited by examiner

METHOD AND SYSTEM FOR MEMS SWITCHES FABRICATED IN AN INTEGRATED CIRCUIT PACKAGE

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for MEMS switches fabricated in an integrated circuit package.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

As the number of electronic devices enabled for wireline and/or mobile communications continues to increase, significant efforts exist with regard to making such devices more power efficient. For example, a large percentage of communications devices are mobile wireless devices and thus often operate on battery power. Additionally, transmit and/or receive circuitry within such mobile wireless devices often account for a significant portion of the power consumed within these devices. Moreover, in some conventional communication systems, transmitters and/or receivers are often power inefficient in comparison to other blocks of the portable communication devices. Accordingly, these transmitters and/or receivers have a significant impact on battery life for these mobile wireless devices.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for MEMS switches fabricated in an integrated circuit package, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for MEMS switches fabricated in an integrated circuit package. Exemplary aspects of the invention may comprise a multi-layer package electrically coupled to an integrated circuit. RF components and one or more MEMS switch arrays may be integrated within the multi-layer package. The MEMS switch arrays may be electrostatically or magnetically activated. The RF components may be electrically coupled to the integrated circuit via the one or more MEMS switch arrays. The RF components may be coupled to one or more capacitor arrays within the integrated circuit. The RF components may comprise transformers, inductors, transmission lines, microstrip and/or coplanar waveguide filters and/or surface mount devices. The integrated circuit may be coupled to the multiple-layer package utilizing via flip-chip bonding.

Figure 1:
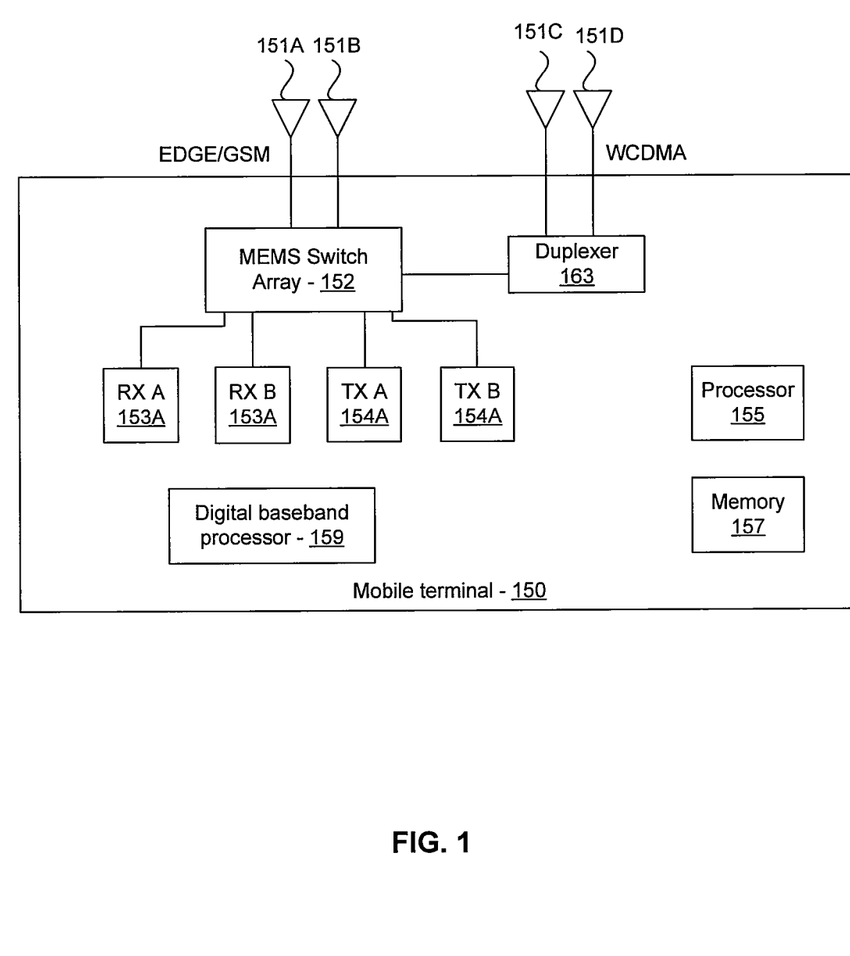
FIG. 1 is a block diagram of an exemplary multi-band wireless system utilizing MEMS switch arrays, in accordance with an embodiment of the invention.

FIG. 1 is a block diagram of an exemplary multi-band wireless system utilizing MEMS switch arrays, in accordance with an embodiment of the invention. Referring to FIG. 1, there is shown wireless system 150, which may comprise RF receivers 153A and 153B, RF transmitters 154A and 154B, a MEMS switch array 152, a digital baseband processor 159, a processor 155, a memory 157, a duplexer 163 and antennas 151A, 151B, 151C and 151D. One or more of the antennas 151A and 151B may be communicatively coupled to the MEMS switch array 152 or the duplexer 163, and each antenna may be configured to handle signals in a specific frequency range.

The MEMS switch array 152 may comprise an array of individually addressable MEMS switches for selectively coupling the RF transmitters 154A and 154B and/or the RF receivers 153A and 153B to the appropriate antennas 151A and/or 151B or 151C, and/or 151D via the duplexer 163. The MEMS switch array 152 may couple an appropriate transmitter 154A or 154B to an antenna on the wireless system 150, depending on the frequency requirements of the system. The MEMS switch array 152 may couple one or more of the antennas 151A, 151B, 151C and 151D to an appropriate receiver 153A or 153B, depending on the application. The MEMS switch array is described further with respect to FIGS. 2-4.

The antennas 151A and 151B may be used for EDGE/GSM applications, and the antennas 151C and 151D may be utilized via the duplexer 163 for WCDMA, for example.

The RF receivers 153A and 153B may comprise suitable logic, circuitry, and/or code that may enable processing of received RF signals. The RF receivers 153A and 153B may enable receiving of RF signals in frequency bands utilized by various wireless communication systems, such as Bluetooth, WLAN, GSM, and/or WCDMA, for example. The MEMS switch array 152 may couple the receivers 153A and/or 153B to the appropriate antenna, depending on the application and/or frequency.

The digital baseband processor 159 may comprise suitable logic, circuitry, and/or code that may enable processing and/or handling of baseband signals. In this regard, the digital baseband processor 159 may process or handle signals received from the RF receivers 153A and 153B and/or signals to be transferred to the RF transmitters 154A and 154B for transmission via a wireless communication medium. The digital baseband processor 159 may also provide control and/or feedback information to the RF receivers 153A and 153B and to the RF transmitters 154A and 154B, based on information from the processed signals. The digital baseband processor 159 may communicate information and/or data from the processed signals to the processor 155 and/or to the memory 157. Moreover, the digital baseband processor 159 may receive information from the processor 155 and/or the memory 157, which may be processed and transferred to the RF transmitters 154A and 154B for transmission to the wireless communication medium.

The RF transmitters 154A and 154B may comprise suitable logic, circuitry, and/or code that may enable processing of RF signals for transmission. The RF transmitters 154A and 154B may enable transmission of RF signals in frequency bands utilized by various wireless communications systems, such as Bluetooth, WLAN, GSM and/or WCDMA, for example, and as such may be frequency tunable and standard selectable. In an embodiment of the invention, each of the RF transmitters 154A and 154B may be configured for a particular application, frequency and/or power level, for example. In this manner, the MEMS switch array 152 may be utilized to couple the appropriate RF transmitter for a particular application. The number of RF transmitters and receivers is not limited to the number shown in FIG. 1. Accordingly, any number of RF transmitters and receivers may be integrated in the wireless system 150 defined by the number of wireless standards, frequencies and/or power levels required, for example.

The processor 155 may comprise suitable logic, circuitry, and/or code that may enable control and/or data processing operations for the wireless system 150. The processor 155 may be utilized to control at least a portion of the RF receivers 153A and 153B, the RF transmitters 154A and 154B, the digital baseband processor 159, and/or the memory 157. In this regard, the processor 155 may generate at least one signal for controlling operations within the wireless system 150.

The memory 157 may comprise suitable logic, circuitry, and/or code that may enable storage of data and/or other information utilized by the wireless system 150. For example, the memory 157 may be utilized for storing processed data generated by the digital baseband processor 159 and/or the processor 155. The memory 157 may also be utilized to store information, such as configuration information, that may be utilized to control the operation of at least one block in the wireless system 150. For example, the memory 157 may comprise information necessary to configure the RF receivers 153A and/or 153B to enable receiving RF signals in the appropriate frequency band.

The MEMS switch array 152 may comprise an array of individually addressable MEMS switches for selectively coupling the RF transmitters 154A and 154B and/or the RF receivers 153A and 153B to the appropriate antennas 151A and/or 151B or 151C, and/or 151D via the duplexer 163. The MEMS switch array is described further with respect to FIGS. 2-4.

The duplexer 163 may comprise suitable circuitry, logic and/or code for combining two signals, the output generated by the RF transmitters 154A and 154B and the signal received by the antenna 151C and/or 151D via the duplexer 163, into one such that communication may be transmitted and received on the same antenna concurrently. The duplexer 163 may comprise a plurality of duplexers in instances where multiple frequency bands may be desired, and may be utilized in applications, such as WCDMA, for example, where full duplex communication may be required.

In operation, one or both of the RF transmitters 154A and 154B may be enabled to generate one or more amplified RF signals. Depending on the wireless communication standard being utilized, the signal may be communicated to one or both of the antennas 151A and 151B via the MEMS switch array 152. In another embodiment of the invention, the signal may be communicated to one or both of the antennas or 151C and 151D via the duplexer 163 and the MEMS switch array 152. The duplexer 163 may enable two-way communication of signals, allowing for transmitting and receiving simultaneously.

In another embodiment of the invention, in instances where duplex communication may not be required, the signal generated by the RF transmitters 154A or 154B may be communicated to the selected antenna or antennas 151A and/or 151B via the MEMS switch array 152.

Figure 2:
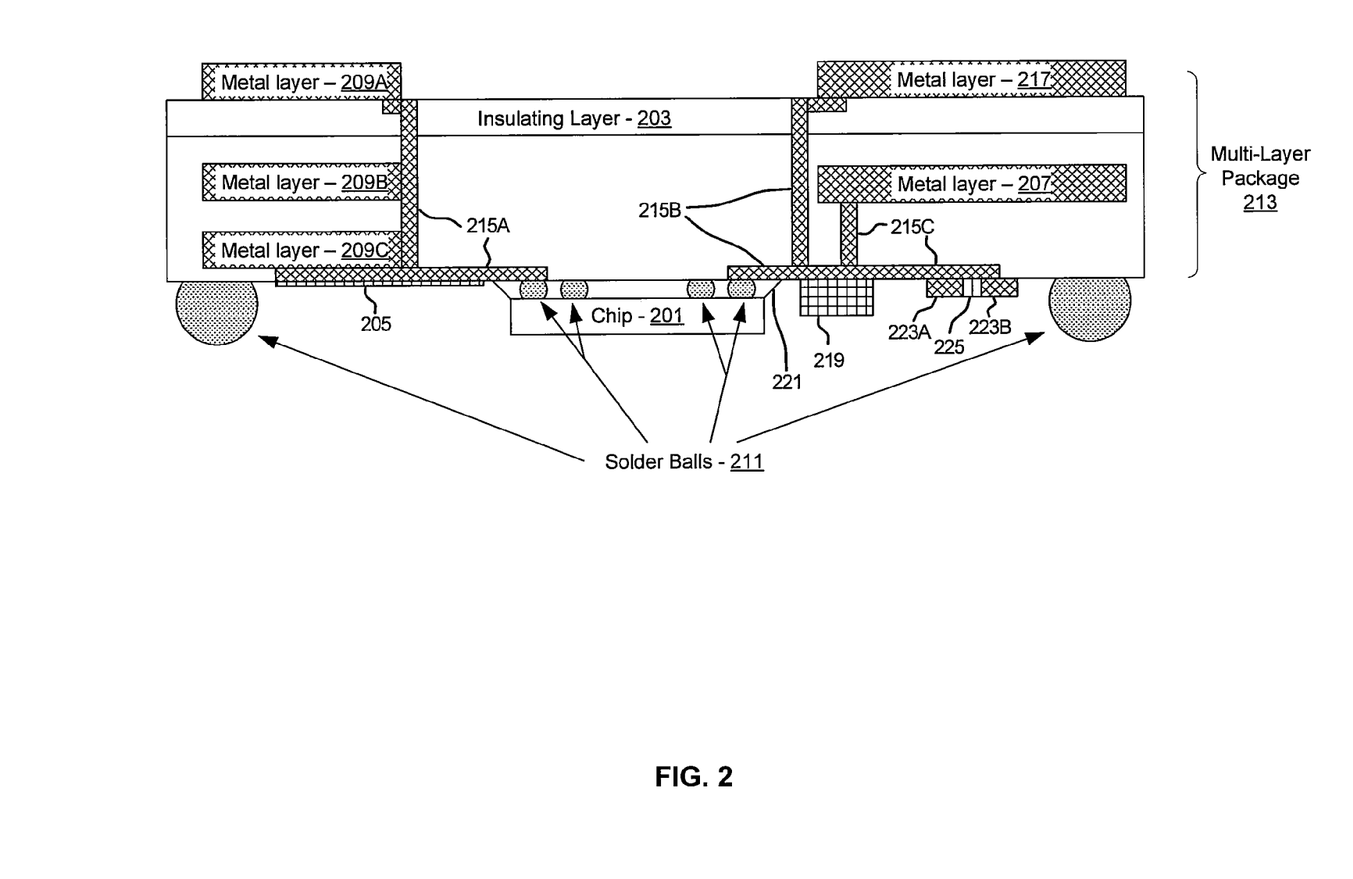
FIG. 2 is a block diagram illustrating a cross sectional view of a multi-layer package with integrated MEMS switches, in accordance with an embodiment of the invention.

In an embodiment of the invention, the components of the wireless system 150 may be integrated on an integrated circuit, or chip, that may be coupled to a multi-layer package comprising a plurality of components on the top and bottom surfaces as well as embedded within the package, as described further in FIG. 2. The package may comprise a multi-layer structure to which integrated circuits may be flip-chip bonded. The incorporation of RF components, such as filters, inductors, capacitors and switches, for example, on integrated circuits may be increasingly difficult as the frequency of operation of devices increases to the tens of GHz range and/or decreases to the GHz range. Additionally, RF components on an integrated circuit may take valuable chip real estate, increasing chip size and cost. By integrating RF components in the multi-layer package, the size of these devices may be greatly reduced, which may be increasingly important as the frequency of operation of the wireless system 150 may be extended to the 60 GHz range or below the GHz range.

FIG. 2 is a block diagram illustrating a cross sectional view of a multi-layer package with integrated MEMS switches, in accordance with an embodiment of the invention. Referring to FIG. 2, there is shown a chip 201, an insulating layer 203, MEMS switch arrays 205 and 225, metal layers 207, 209A, 209B, 209C, 215A, 215B, 215C, 217, 223A and 223B, solder balls 211, multi-layer package 213, surface mount devices 219 and thermal epoxy 221.

The chip 201, or integrated circuit, may comprise the wireless system 150 described with respect to FIG. 1, or may also comprise any other integrated circuit that may require filter components and/or devices. The chip 201 may be bump-bonded or flip-chip bonded to the multi-layer package 213 utilizing the solder balls 211. In this manner, wire bonds connecting the chip 201 to the multi-layer package 213 may be eliminated, reducing and/or eliminating uncontrollable stray inductances due to wire bonds. In addition, the thermal conductance out of the chip 201 may be greatly improved utilizing the solder balls 211 and the thermal epoxy 221. The thermal epoxy 221 may be electrically insulating but thermally conductive to allow for thermal energy to be conducted out of the chip 201 to the much larger thermal mass of the multilayer package 213.

The MEMS switch arrays 205 and 225 may comprise an array of MEMS switches fabricated in and/or on the multi-layer package 213. The MEMS switches may be individually addressable and may be utilized to couple components within the chip 201 to RF components integrated in or on the multi-layer package 213. By incorporating MEMS switches and RF components on the multi-layer package, as opposed to in the chip 201, chip area usage may be significantly reduced and performance improved, as discrete RF devices and MEMS switches typically have higher Q and reduced insertion loss, respectively, compared to their CMOS counterparts on-chip.

The metal layers 207, 209A, 209B, 209C, 215A, 215B, 215C, 217, 223A and 223B may comprise deposited metal layers utilized to delineate RF components such as inductors, transformers, baluns, capacitors, antennas, transmission lines, microstrip filters or coplanar waveguides, for example. The metal layer 209 may be patterned such that it may comprise a transmission line that may be utilized to impedance match a power amplifier in the chip 201 to an antenna, such as the antennas 151A-D described with respect to FIG. 1, for example. In another embodiment of the invention, the metal layers 201 and 217 may comprise a microstrip structure, the impedance of which may be tuned, for example.

In another embodiment of the invention, the metal layers 223A and 223B and the MEMS switch array 225 may comprise an adjustable length transmission line or microstrip filter, wherein a plurality of MEMS switches may be utilized to switch in and out segments of the transmission line or microstrip. In this manner, the impedance of the transmission line or microstrip may be adjusted, tuning the resonance frequency of the component. The metal layer 217 may comprise an antenna fabricated on the multi-layer package 213. Similarly, in instances where a MEMS switch array may be integrated with the metal layer 217, such that segments of the metal layer 217 may be switched in and out of the circuit, an adjustable antenna may result.

In an embodiment of the invention, one or more of the metal layers may comprise ferromagnetic and/or ferrimagnetic layers utilized to define devices such as transformers, inductors, baluns, isolators, circulators, and gyrators. Accordingly, the metal layers 209A, 209B, 209C and 215A may comprise a transformer that may be utilized to provide inductance for an RF filter, or as a balun for coupling a power amplifier to an antenna for example.

The metal layers 215B and 215C may provide electrical contact to the surface mount devices 219 from the chip 201 via the solder balls 211. The number of metal layers may not be limited to the number of metal layers 207, 209A, 209B, 209C, 215A, 215B, 215C, 217, 223A and 223B shown in FIG. 2. Accordingly, there may be any number of layers embedded within the multi-layer package 213, depending on the number of contacts on the chip 201 coupled to the solder balls 211, and the number of RF components fabricated within and/or on the multi-layer package 213.

The solder balls 211 may comprise spherical balls of metal to provide electrical, thermal and physical contact between the chip 201 and the multi-layer package 213. In making the contact with the solder balls 211, the chip may be pressed with enough force to squash the metal spheres somewhat, and may be performed at an elevated temperature to provide suitable electrical resistance and physical bond strength. The thermal epoxy 221 may fill the volume between the solder balls 211 and may provide a high thermal conductance path for heat transfer out of the chip 201. The solder balls 211 may also be utilized to provide electrical, thermal and physical contact between the multi-layer package 213 and a printed circuit board comprising other parts of the wireless system 150, described with respect to FIG. 1.

The surface mount devices 219 may comprise a plurality of discrete circuit elements such as resistors, capacitors, inductors, and diodes, for example. The surface mount devices 219 may be soldered to the multi-layer package 213 to provide electrical contact.

In operation, the chip 201 may comprise a wireless system, such as the wireless system 150, described with respect to FIG. 1, and may be utilized to transmit, receive and process RF signals. The chip 201 may be electrically coupled to RF components or devices fabricated on and/or within the multi-layer package 213, such as transformers, baluns, transmission lines, inductors, capacitors, microstrip filters, coplanar waveguide filters, MEMS switch arrays and surface mount devices, for example. Heat from the chip 201 may be conducted to the multi-layer package via the thermal epoxy 221 and the solder balls 211. The MEMS switch array 205 may be utilized to couple RF devices fabricated in and/or on the multi-layer package 213 to associated components within the chip 201.

In an embodiment of the invention, an array of capacitors in the chip 201 may be used in conjunction with the RF components and devices in and/or on the multi-layer package 213 to create narrow-bandwidth, finely-tuned variable frequency capability devices. For example, filter performance may be significantly improved over conventional systems that utilize a wide bandwidth filter to cover a plurality of frequencies or frequency ranges, and thus allow more unwanted signals to pass.

Figure 3:
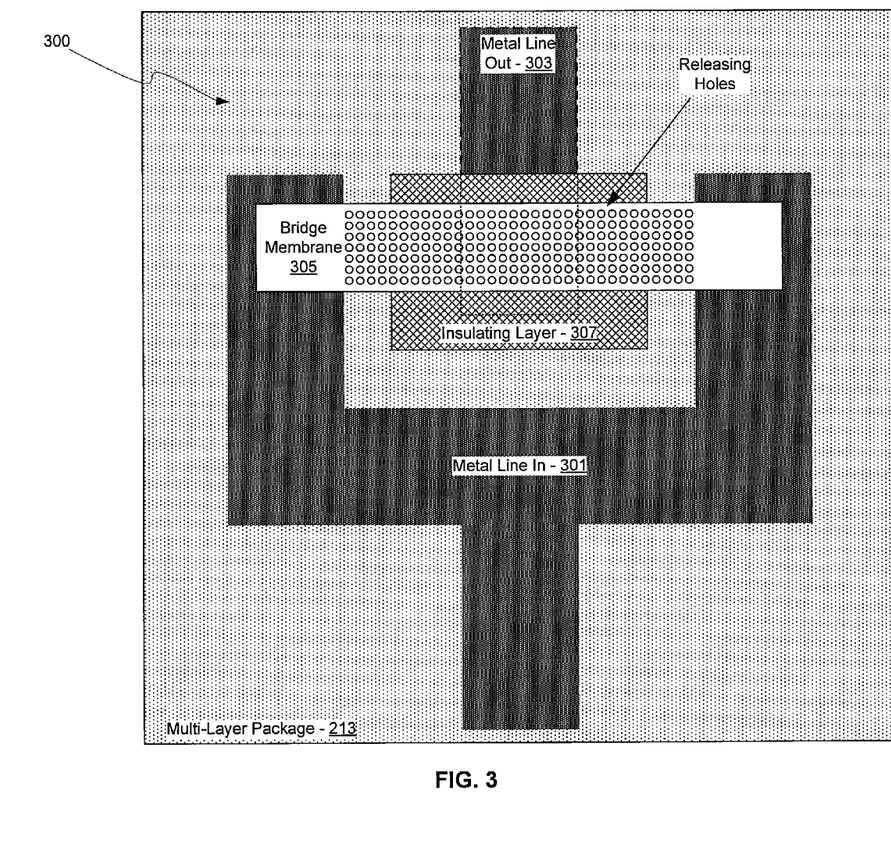
FIG. 3 is a block diagram of an exemplary MEMS switch, in accordance with an embodiment of the invention.

FIG. 3 is a block diagram of an exemplary MEMS switch, in accordance with an embodiment of the invention. Referring to FIG. 3, there is shown a MEMS switch 300 fabricated on the multi-layer package 213, described with respect to FIG. 2. The MEMS switch 300 may comprise a metal line in 301, a metal line out 303, a bridge membrane 305 and an insulating layer 307. The multi-layer package 213 may be covered with an electrically isolating layer, such as the insulating layer 203 described with respect to FIG. 2.

The metal line in 301 and the metal line out 303 may comprise metal layers deposited on the multi-layer package 213 and patterned into the structure shown. The bridge membrane 305 may comprise a conductive layer that may be supported on each end by the metal line in 301 and may be suspended over the insulating layer 307, when not in a closed position. The switching action of the MEMS switch 300 is described further with respect to FIG. 4.

The insulating layer 307 may comprise a dielectric layer, such as silicon nitride, for example that separates the metal line out 303 from the bridge membrane 305 when the MEMS switch 300 may be in the closed position.

In operation, the MEMS switch may be closed by applying a bias across the metal line in 301 and the metal line out 303, such that the bridge membrane 305 may be pulled downward toward the insulating layer 307. The resulting capacitor formed by the metal line in 301, the insulating layer 307 and the metal line out 303 may provide capacitive coupling of an RF signal from the metal line in 301 to the metal line out 303.

MEMS switches may utilize electrostatic force to produce mechanical movement to achieve a short or an open circuit in an RF transmission line. The switches may provide performance advantages such as low insertion loss, high isolation and virtually no power consumption making them ideally suited for use in wireless devices.

In another embodiment of the invention, the bridge membrane 305 may comprise ferromagnetic material such that it may be deflected by magnetic forces as opposed to electrostatic forces. The magnetic fields may be generated by applying electrical currents to an inductive coil integrated below the MEMS switch 300, for example.

Figure 4:
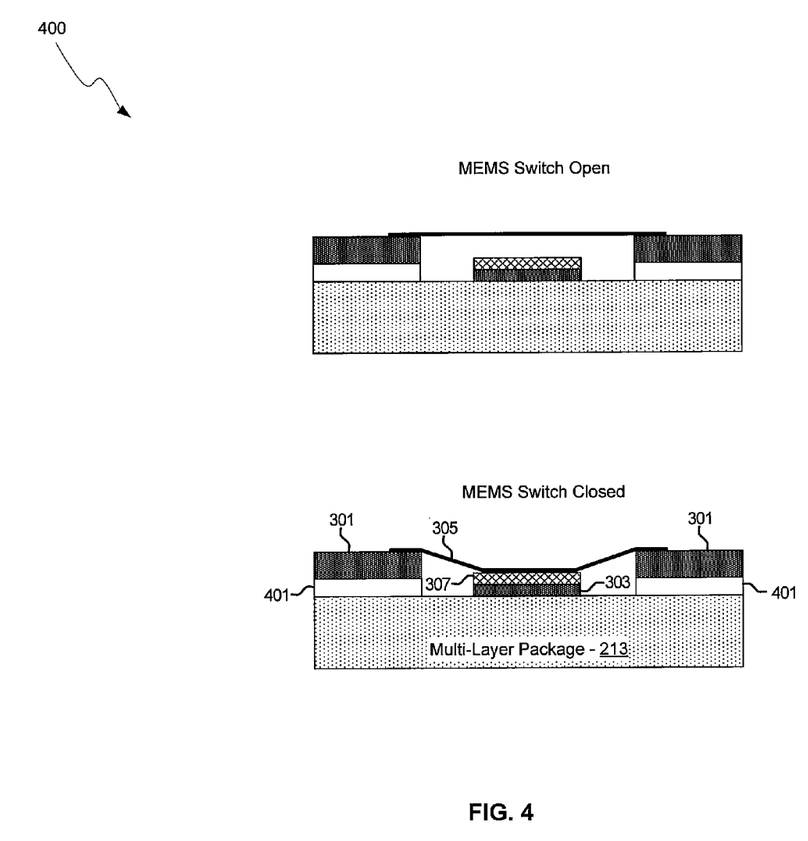
FIG. 4 is a block diagram illustrating an exemplary MEMS switch operation, in accordance with an embodiment of the invention.

FIG. 4 is a block diagram illustrating an exemplary MEMS switch operation, in accordance with an embodiment of the invention. Referring to FIG. 5, there is shown the cross-section view of a MEMS switch 400 in an open position (top) and in closed position (bottom). The MEMS switch 400 may comprise the metal line in 301, the metal line out 303, the bridge membrane 305, the insulating layer 307 and the electrically isolating layer 401, which may be substantially similar to the insulating layer 307. The metal line in 301, the metal line out 303 and the bridge membrane 305 may be as described with respect to FIG. 3.

In operation, with zero or low DC bias applied between the metal lines, the bridge membrane may be essentially horizontal, such that the MEMS switch may be open (top). In instances where a high enough bias is applied across the metal line out 303 and the metal line in 301, the bridge membrane may be attracted toward the insulating layer 307 by electrostatic force, closing the switch (bottom).

Figure 5:
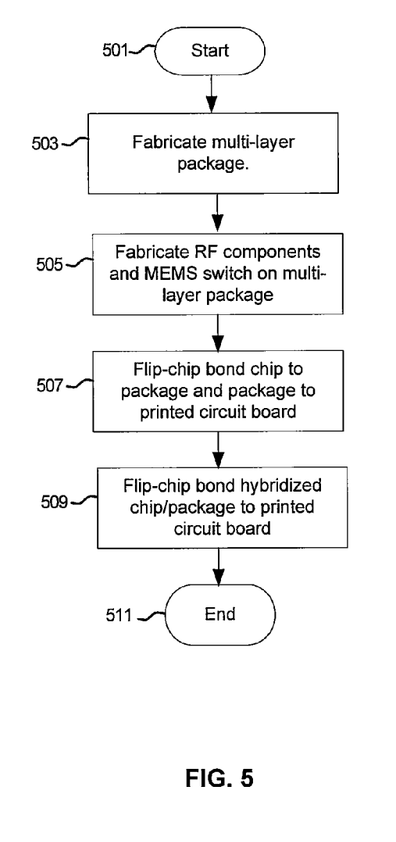
FIG. 5 is a flow diagram illustrating exemplary steps in the fabrication of MEMS switches in an integrated circuit package, in accordance with an embodiment of the invention.

FIG. 5 is a flow diagram illustrating exemplary steps in the fabrication of MEMS switches in an integrated circuit package, in accordance with an embodiment of the invention. In step 503, after start step 501, the multi-layer package may be fabricated with metal conductive and ferromagnetic layers embedded within the structure. In step 505, RF components and MEMS switches may be fabricated on the top and/or bottom surfaces of the multi-layer package. In step 507, a chip may be flip-chip bonded to the multi-layer package and in step 509, the package may then be flip-chip bonded to a printed circuit board where thermal epoxy may be utilized to fill the volume between the solder balls between the chip and the package, followed by end step 511.

Figure 6:
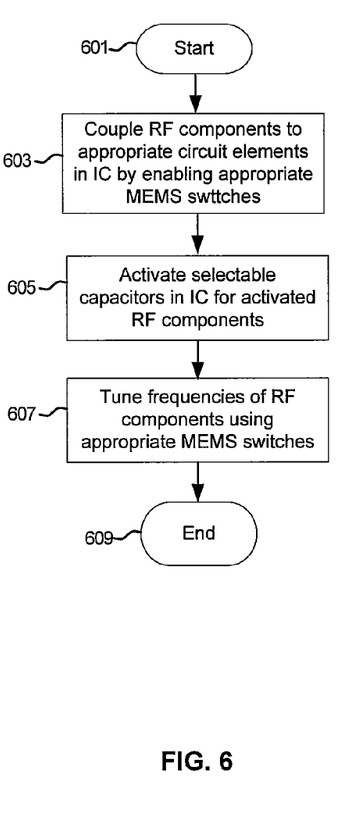
FIG. 6 is a flow diagram illustrating exemplary steps in the control of RF components utilizing integrated MEMS switch arrays, in accordance with an embodiment of the invention.

FIG. 6 is a flow diagram illustrating exemplary steps in the control of RF components utilizing integrated MEMS switch arrays, in accordance with an embodiment of the invention. In step 603, after start step 601, RF components may be coupled to appropriate circuit elements in the integrated circuit by enabling appropriate MEMS switches. In step 605, selectable capacitors in the integrated circuit may be activated to couple to the RF components, and in step 607 the frequencies of the RF components may be tuned using appropriate MEMS switches, followed by end step 609.

In an embodiment of the invention, a method and system are disclosed for coupling a multi-layer package 213 to an integrated circuit 201. RF components and one or more MEMS switch arrays 205 and 225 may be integrated in the multi-layer package 213. The RF components may be electrically coupled to the integrated circuit via the one or more MEMS switch arrays 205 and 225. The MEMS switch arrays 205 and 225 may be electrostatically or magnetically activated. The RF components may be coupled to one or more capacitor arrays in the integrated circuit 201. The RF components may comprise transformers 209A/209B/209C, inductors, transmission lines 223A and 223B, microstrip and/or coplanar waveguide filters 223A/223B and/or surface mount devices 219. The integrated circuit 201 may be coupled to the multiple-layer package 213 utilizing a flip-chip bonding technique.

Certain embodiments of the invention may comprise a machine-readable storage having stored thereon, a computer program having at least one code section for wireless communication, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:

in a wireless system, controlling switching of RF components and signals handled by said RF components within an integrated circuit via one or more MEMS switch arrays integrated with a multi-layer package bonded to said integrated circuit;

wherein at least one MEMS switch in said one or more MEMS switch arrays comprises a bridge membrane supported on each end by an input terminal.

2. The method according to claim 1, comprising tuning said one or more RF components via said one or more MEMS switch arrays.

3. The method according to claim 1, comprising switching said one or more RF components via said one or more MEMS switch arrays.

4. The method according to claim 1, wherein said one or more MEMS switch arrays are magnetically activated or electrostatically activated.

5. The method according to claim 1, wherein said RF components are coupled to one or more capacitor arrays within said integrated circuit.

6. The method according to claim 1, wherein said RF components comprise transformers.

7. The method according to claim 1, wherein said RF components comprise inductors.

8. The method according to claim 1, wherein said RF components comprise MEMS switch configured transmission lines.

9. The method according to claim 1, wherein said RF components comprise microstrip and/or coplanar waveguide filters.

10. The method according to claim 1, wherein said RF components comprise surface mount devices.

11. The method according to claim 1, wherein said integrated circuit is electrically coupled to said multiple-layer package via a flip-chip bonding technique.

12. A system for wireless communication, the system comprising:

a multi-layer package bonded to an integrated circuit, wherein said multi-layer package comprises integrated RF components and one or more MEMS switch arrays, and wherein said RE components are electrically coupled to said integrated circuit via said one or more MEMS switch arrays;

wherein at least one MEMS switch in said one or more MEMS switch arrays comprises a bridge membrane supported on each end by an input terminal.

13. The system according to claim 12, wherein said one or more RF components are tuned via said one or more MEMS switch arrays and/or said integrated circuit.

14. The system according to claim 12, wherein said one or more RF components are switched via said one or more MEMS switch arrays and/or said integrated circuit.

15. The system according to claim 12, wherein said one or more MEMS switch arrays are magnetically activated or electrostatically activated.

16. The system according to claim 12, wherein said RF components are coupled to one or more capacitor arrays in said integrated circuit.

17. The system according to claim 12, wherein said RF components comprise transformers.

18. The system according to claim 12, wherein said RF components comprise inductors.

19. The system according to claim 12, wherein said RF components comprise MEMS switch configured transmission lines.

20. The system of claim 12, wherein said RF components comprise microstrip and/or coplanar waveguide filters.

21. The system of claim 12, wherein said RF components comprise surface mount devices.

22. The system of claim 12, wherein said integrated circuit is coupled to said multiple-layer package utilizing a flip-chip bonding technique.

* * * * *